Patented Sept. 21, 1971

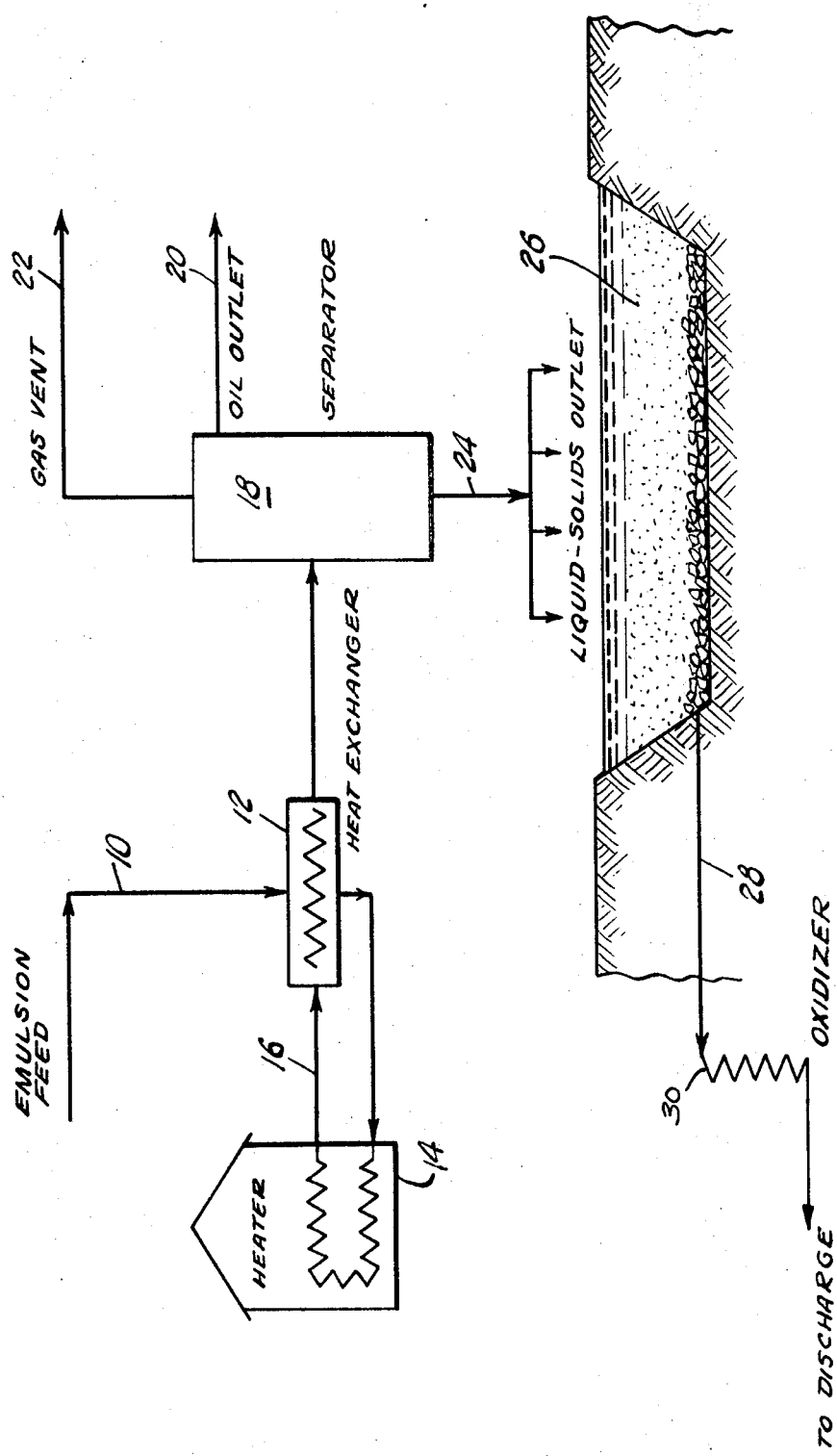

3,606,731
WATER TREATING PROCESS
Edward Cole, Fishkill, and Howard V. Hess, Glenham, N.Y., assignors to Texaco Inc., New York, N.Y.
Filed Nov. 20, 1969, Ser. No. 878,483
Int. Cl. B01d *19/00, 37/00;* C02b *1/02, 1/34*
U.S. Cl. 55—45                          5 Claims

ABSTRACT OF THE DISCLOSURE

A water treatment process for breaking emulsions such as algae-oil-water emulsions into gas, oil, water and coke includes the steps of coking the emulsions under autogenous pressure at 450 to 700° F. for 0.5 minute to 120 minutes, cooling to form a separable, four phase system comprising gases, oil, water and coke; venting off the gases; removing the oil to thereby obtain a water-coke slurry, filtering off the coke and collecting an aqueous phase. The aqueous phase can be reduced in COD by treating with air at elevated temperature prior to final disposal. The oil is suitable for recycling to a crude still. The process can be carried out either batchwise or on a continuous basis and is particularly useful for breaking algae-oil-water emulsions occurring in API separators.

---

This invention concerns a water treatment process for breaking algae-oil-water emulsions and in particular emulsions of the character described which occur in waste water treatment facilities and in API separators.

API separators are a type of continuous flow settling concrete tank designed to recommendations of the American Petroleum Institute and which are used for gravity separation of oil and water. API separators frequently present ideal conditions for the growth of phytoplankton and bacteria, as sunlight and nutrients such as salts of phosphates, nitrogen, iron etc. are abundant in the aqueous solution. The presence of the phytoplankton in API separators creates a medium for the growth of the algae feeders e.g. protozoa of the ameboid or ciliate types, nemathelminthes, trochelminthes, anthropoda, etc. The plants whether living or dead readily form emulsions with the oil-water system which when removed from the API separators do not respond to breaking by conventional means. Nonetheless it is necessary to separate the emulsions from the effluent of the API separators because of the inhibitory effect the emulsion will have on subsequent processing. In practice, such separation gives rise to serious difficulties.

Thus if trickling filters are used the capacity of the filters is reduced by the wetting of the filter media by the algae-oil-water emulsion at the expense of the desirable film of microbial growth. Similarly, if ponds are used, the capacity of non-aerated oxidation ponds is reduced since a desirable algae growth in these ponds is retarded by the scum of algae-oil-water emulsion that effectively shields the lower water layers from sunlight. Further, experience with activated sludge systems dictates that the oil that enters the microbiological treatment system be kept at a low value because of capacity considerations and since serious frothing may be encountered during aeration.

The fact that algae are good emulsion formers is not surprising as they contain algenates which are used commercially as stabilizers and emulsifiers in the food, pharmaceutical and textile industries.

If an emulsion containing algae is run off into a body of water under certain conditions the algae may grow in superabundance. Ultimately the algae will die and in decomposing will use oxygen from the water. In the extreme case, enough oxygen can be removed from the water to reduce the amount of dissolved oxygen present to a level below that necessary to sustain fish life. This fact constitutes another reason for not disposing of algae in suburban rivers, lakes or estuaries.

It is a recognized fact that algae-oil-water emulsions do not respond to separation by conventional techniques.

It is therefore an object of this invention to provide a novel process for breaking non-filterable emulsions of the character described.

It is also an object of the invention to provide a water treatment process whereby the water present in an algae-oil water emulsion may be sufficiently reduced in COD to permit its final disposal in a body of water without polluting the same.

Further objects and advantages of our invention will be apparent to those skilled in the art from the following description when in conjunction with the accompanying drawing in which the single figure illustrates diagrammatically an installation for carrying out the process of this invention.

Referring to the drawing, an installation suitable for carrying out the instant process will be seen to comprise a heat exchanger 12 to which the emulsion to be broken is pumped or otherwise conveyed through line 10. The emulsion is preheated owing to its heat exchange with the coked solution coming out of tubular heater 14 through line 16. In tubular heater 14, the emulsion is coked under autogenous pressure at 450° to 700° F. for 0.5 minute to 120 minutes and sent on to separator 18 where it settles as a four phase system. The gas is removed through line 22 and oil through line 20 for recycling to a crude still if desired. A slurry of water and solids mainly coked algae and the like is drained off the bottom of the separator through line 24 and onto a sand filter 26 composed mainly of sand on gravel with an agricultural tile collection system. Other filtration systems may be employed here. At any rate, the solids remain on the filter while turbid water goes through line 28 for further treatment such as an oxidation in oxidizer unit 30 at elevated temperatures of above 450° F. under sufficient pressure to prevent vaporization of water to yield an effluent of low COD suitable for disposal in bodies of water without polluting same.

There exists an interrelation between coking time and coking temperature such that lower temperatures require longer coking time and vice versa. Thus coking one minute at 500 or 525° F. does not yield a product which separates by gravity into its components in a satisfactory manner. However, coking one minute at 550° F. or 10 minutes at 525° F. gives a product that responds to gravity separation. Under the system condition set forth only the algae and other biota will coke without affecting the oil which will not coke under the conditions present. Some coke remains in the oil which is decanted and will burn with the oil. However, the bulk of the coke will appear in the aqueous layer.

EXAMPLE I

A sample of Algae-Oil-Water sludge from the Texaco Inc. Refinery at Anacortes, Wash., was found to have the following composition:

Water, wt. percent, D–1744 [1] _____ 68
Water and sediment percent, D–96:
    Water, percent _____ 74
    Sediment, percent _____ 20

[1] Karl Fisher.

EXAMPLE II

A sample consisting of 971 grams (1000 ml.) of sludge, having the composition given in Example I, was placed in an autoclave of 1980 ml. capacity. The autoclave was flushed with nitrogen, sealed, heated to 600° F. and held at this temperature without shaking for two hours. It was cooled to 82° F. and 1260 ml. of gas were withdrawn. The autoclave walls were observed to be clean. 943 grams of product were filtered easily. The filtrate immediately separated into oil and water phases. The filter cake was dried at 220° F. The characteristics of the products recovered were:

| Sample | Oil | Water | Coke | Gas |
|---|---|---|---|---|
| Sample, wt. g | 223 | 584 | [1] 122 [2] 59 | 1.5 |
| Sample No. L-69 | 68A | 69B | 68C | 68G |
| Specific gravity, 60° F./60° F | 0.8703 | | | |
| Carbon, wt. percent | | | 44.4 | |
| Sulfur, wt. percent | | | 6.8 | |
| Ash, wt. percent | | | 34.0 | |
| COD, mg. O₂/l.[3] | | 3500 | | |
| pH | | 9.1 | | |
| Water and sediment, percent | 0.1 | | | |
| ASTM dist.: | | | | |
| IBP | 22.1 | | | |
| 5 | 326 | | | |
| 10 | 398 | | | |
| Mole percent: | | | | |
| H₂[4] | | | | 23.1 |
| C₁–C₆ | | | | 4.1 |
| H₂S | | | | 9.7 |
| CO₂ | | | | 63.1 |

[1] Wet.
[2] Dry.
[3] Chemical oxygen demand, milligrams per liter.
[4] Nitrogen free basis.

EXAMPLE III

A sample consisting of 971 grams (1000 ml.) of sludge having the composition given in Example I were placed in an autoclave of 1980 ml. capacity. The autoclave was flushed with nitrogen, sealed, heated under autogenous pressure to 575° F. and held at this temperature for two hours without shaking. It was cooled to about 80° F. No recovery of gas was made.

954 grams of product was recovered from the autoclave and vacuum filtered. The filtrate was allowed to settle to give oil and water phases. The filter cake was dried at 220° F. The characteristics of the products recovered were:

| Sample | Oil | Water | Filter cake |
|---|---|---|---|
| Sample, wt. g | 162 | 694 | [1] 92 [2] 35 |
| Sample No. L-69 | 70A | 70B | 70C |
| Specific gravity, 60° F./60° F | 0.8744 | | |
| Carbon, wt. percent | | | 37.1 |
| Sulfur, wt. percent | | | 9.37 |
| Ash, wt. percent | | | [3] 39.4 |
| Water, wt. percent | 0.04 | | |
| COD, mg. O₂/l | | 4,365 | |
| Nitrogen, percent | | | 0.5 |
| ASTM dist.: | | | |
| IBP-338 | 70-605 | | |
| 5-390 | 80-617 | | |
| 10-434 | 90-670 | | |
| 20-476 | EP 700 | | |
| 30-505 | Recy 95 | | |
| 40-530 | Loss 5 | | |
| 50-551 | Res. coke | | |
| 60-576 | | | |

[1] Wet.
[2] Dry.
[3] Spec analysis:
  Major amounts: Al, Mg, Fe, Si.
  Minor amounts: Ca, Cr.
  Trace: Cu.

EXAMPLE IV

A sample consisting of 971 grams (1000 ml.) sludge having the composition given in Example I was placed in an autoclave of 1980 ml. capicity. The autoclave was flushed with nitrogen, sealed, heated to 575° F. and held at this temperature for two hours. It was cooled to 80° F. and 1660 ml. of gas was recovered. There was recovered 962 grams of liquid-solids product from autoclave which was placed in separatory funnel at room temperature and allowed to settle 16 hours. 149 grams of oil and 736 grams of water-coke layer were separated leaving an interface layer of 77 grams. The samples were submitted for tests with the following results:

| Sample | Oil from separator | Interface | Water-coke layer |
|---|---|---|---|
| Sample wt., grams | 149 | 77 | 735 |
| Sample No. L-69 | 71A | 71C | 71B |
| Specific gravity, 60° F./60° F | 0.8728 | | |
| Water sediment: | | | |
| Water, percent | 1.1 | 4 | 85 |
| Sediment, percent | 0.5 | 6 | 5 |

A sample consisting of 68 grams of the water-coke layer was charged to a sand filter constructed by using a 2 inch glass tube with layers of 1 inch width of glass wool, glass beads and 3 inches of sea sand over the first two. The water-coke layer was charged to the filter and basis the charge the filter rate was 1.35 gals./sq. ft./hour. The following tests were secured on the products which shows that this system using the sand filter is operable:

The water layer filtered readily. There was little penetration of coke into sand filter and after draining the cake separated easily from the sand.

| Sample | Filtrate | Cake from sand filter |
|---|---|---|
| Sample wt., g | [1] 468 | [2] 121 [3] 44 |
| Sample No. L-60 | 71D | 71E |
| COD, mg. O₂/l | 2,700 | |
| pH | 9.3 | |
| Ash, wt. percent | | 49.1 |

[1] Loss due to hold-up in bed.
[2] Wet.
[3] Dried at 220° F.

ANALYSIS OF GAS FROM AUTOCLAVE

Sample No. _____[1] L-69-71G
Mole percent H₂ _____ 21.8
C₁–C₆ _____ 5.7
CO₂ _____ 61.9
H₂S _____ 10.6

[1] Nitrogen free. Calculated 1.05 grams.

YIELD SUMMARY

Product: Wt. percent
Oil _____ 22.6
Gas _____ 0.1
Water _____ 63.5
Wet cake or basis dry cake _____ 13.8
Oil _____ 22.6
Gas _____ 0.1
Water _____ 72.3
Dry cake _____ 5.0

EXAMPLE V

A sample consisting of 971 grams (1000 ml.) of sludge having the composition given in Example I were placed in an autoclave of 1980 ml. capacity, the autoclave was flushed with nitrogen, sealed, heated to 550° F. and held at this temperature for one hour without rocking. It was cooled and 961 grams of liquid-solids product were withdrawn. The mixture was allowed to settle one half hour. The top and bottom layers were separated and filtered, each separately. The top layer weighed 247 grams and comprised 75 grams of water, pH 9.3; 20 grams of wet coke; and 145 grams of an oil having the following characteristics:

Specific gravity, 60° F./60° F. _____ 0.8771
Water, wt. percent _____ 0.02
ASTM. Dist.:
  IBP _____ 250
  5 _____ 320
  10 _____ 452
  20 _____ 488
  30 _____ 514
  40 _____ 534
  50 _____ 554
  60 _____ 573
  70 _____ 590
  80 _____ 612
  89 _____ 648

The bottom layer weighed 711 grams and comprised wet coke weighing 96 grams, 5 grams of oil and 446 grams of water (pH 9.3). The wet cokes were combined and dried at 220° F. to give 46 grams dry solids (37 wt. percent ash).

EXAMPLES VI AND VII

These examples show the effect of time and temperature on the products obtained. The equipment used for these examples included:

¾″ x 18″ stainless steel bombs
High tin metal bath
50 ml. burette (½″ ID)

Samples of the sludge of Example I were coked in sealed bomb, cooled and the product placed, in burette and the settling characteristics observed.

| Example | VI | | | VII | | |
|---|---|---|---|---|---|---|
| Charge, g | 50 | | | 50 | | |
| Process conditions: | | | | | | |
| Temperature, 0° F | 505 | | | 550 | | |
| Pressure, p.s.i.g | 725 | | | 1,100 | | |
| Time at temp., min | 1 | | | 1 | | |
| Layers | Oil (ml.) | Water (ml.) | Slurry (ml.) | Oil (ml.) | Water (ml.) | Slurry (ml.) |
| Settling time, hrs.: | | | | | | |
| ½ | 18.5 | 26.5 | 3.5 | 11.5 | 23.5 | 7 |
| 2 | Poor separation | | | 10.5 | 26.5 | 6 |
| 5 | Poor separation | | | 10.5 | 26.5 | 6 |
| 70 | After 70 hours the following layers secured top to bottom: Oil, 10 ml.; Water, 3 ml.; Slurry, 13 ml.; Water, 22 ml.; Slurry, 4 ml. | | | 10.5 | 26.5 | 6 |
| Remarks | Unsatisfactory separation | | | Good separation | | |

EXAMPLES VIII and IX

The following equipment was used:
¾″ x 18″ stainless steel bombs
High tin metal bath
50 ml. burette (½″ ID)

Samples of sludge having the composition given in Example I were coked in a sealed bomb, and cooled. The product was placed in a burette and its settling characteristics observed.

| | Run No. L-69 | | | | | |
|---|---|---|---|---|---|---|
| | 80E | | | 80F | | |
| Example | VIII | | | IX | | |
| Charge, g | 50 | | | 50 | | |
| Process conditions: | | | | | | |
| Temperature, 0° F | 525 | | | 525 | | |
| Pressure, p.s.i.g | 900 | | | 900 | | |
| Time at temp., min | 1 | | | 10 | | |
| Layers | Oil (ml.) | Water (ml.) | Slurry (ml.) | Oil (ml.) | Water (ml.) | Slurry (ml.) |
| Settling time, hrs.: | | | | | | |
| ¼ | Very poor | | | 17 | ¹ 25 | 7 |
| 1¼ | Poor | | | 17 | ¹ 26 | 6 |
| 2¼ | 16.5 | ¹ 25 | 7.5 | 17 | 26 | 6 |
| 7¼ | 16.5 | ¹ 25 | 7.5 | 16 | ² 27 | 6 |
| 23¼ | 16.5 | ¹ 25 | 7.5 | 16 | ² 27 | 6 |
| Remarks | Poor separation characteristics | | | Good separation characteristics | | |

¹ Cloudy.
² Clear.

EXAMPLES X–XIII

Samples of the sludge of Example I were coked in ¾″ x 18″ stainless steel bombs, cooled and filtered in ceramic Buchner funnels O having a 42 mm. diameter. The following characteristics were observed:

| | Run L-69 | | | |
|---|---|---|---|---|
| | 78-1 | 78-3 | 79A | 79C |
| Example | X | XI | XII | XIII |
| Charge, ml. (g.) | 60 (61) | 60 (61) | 60 (61) | 60 (61) |
| Process conditions: | | | | |
| Temperature, 0° F | 550 | 555 | 502 | 505 |
| Pressure, p.s.i.g | 1,050 | 1,100 | 700 | 725 |
| Time at temp., min | 1 | 10 | 1 | 10 |
| Filter time, min | 18 | 14 | 17 | 15 |
| Products: | | | | |
| Oil, ml | 9 | 12 | 10 | 12 |
| Water, ml | 42 | 40 | 39 | 39 |
| Filter cake (wet) | 7.5 | 7 | 6.5 | 6.5 |
| Filter cake (dry) | 2.0 | 3.5 | 2 | 3 |

EXAMPLE XIV

The filtrate, 250 ml., from Example IV, identified as L-69-71D, was placed in a 1980 ml. batch autoclave and treated with air at 575° F. and 1375° F. The total of 6.4 grams of oxygen was used in the treatment. The liquid product was cooled and the COD determined. Recovered 243 grams.

Sample No. _____ L-69-71F
pH _____ 7
COD mg. $O_2/l$ _____ 362

As regards the COD of the purified water obtained as one of the products of the claimed process and referring particularly to Example XIV it will be understood that the COD can be further reduced by subjecting the water to repeated treatments under conditions similar to those given in Example XIV. If desired, other known means may be resorted to further purify this water.

What is claimed is:

1. A process for breaking algae-oil-water emulsions into gases, oil, coke and water comprising coking such emulsions under autogenous pressure at 450 to 700° F. for 0.5 to 120 minutes, and cooling to below 212° F. to form a gravity-separable four phase system comprising gases, oil, coke and an aqueous layer; venting off said gases, removing said oil and filtering off said coke from said aqueous layer.

2. Process according to claim 1, wherein said aqueous layer is oxidized at temperatures above about 450° F. under sufficient pressure to prevent vaporization of water to yield an effluent having a reduced COD.

3. Process according to claim 1, wherein said cooling is effected at a temperature of around 80° F.

4. Installation for breaking algae-oil-water emulsions into gases, oil, coke and water of low COD, comprising, in combination, a heat exchanger receiving said emulsions for preheating same; coking means communicating with said heat exchanger and receiving preheated emulsions therefrom; separator means communicating with said coking means for separating said emulsions, after coking, into gases, oil, coke and water; said separator means including gas venting means in the upper part thereof, oil outlet means positioned below said gas venting means and coke-water outlet means in the lower part thereof; filtering means below said coke-water outlet means for receiving coke and water therefrom and separating same and oxidizer means communicating with said filtering means for receiving water therefrom and oxidizing said water at elevated temperatures under pressure to produce water of low chemical oxygen demand.

5. The installation according to claim 4, wherein said filtering means comprises sand on gravel super-imposed on a tile collection system.

References Cited

UNITED STATES PATENTS

| | | | |
|---|---|---|---|
| 624,893 | 5/1899 | Davis | 210—290 |
| 2,075,224 | 3/1937 | Porteous | 210—71X |
| 3,060,118 | 10/1962 | Schoeffel | 210—63X |
| 3,155,611 | 11/1964 | Porteous | 210—71X |
| 3,507,788 | 4/1970 | Cole et al. | 210—71X |

REUBEN FRIEDMAN, Primary Examiner

R. W. BURKS, Assistant Examiner

U.S. Cl. X.R.

55—175; 196—46.1; 208—177; 210—63, 71, 73, 170, 180, 181